(12) United States Patent
Singh et al.

(10) Patent No.: US 6,493,641 B1
(45) Date of Patent: Dec. 10, 2002

(54) METHODS AND APPARATUS FOR CUSTOMIZING PET FOOD

(75) Inventors: Bhajmohan (Ricky) Singh, St. Louis, MO (US); Diane S. Kalishman, St. Louis, MO (US); Monique Nielsen, St. Louis, MO (US); Bryan Wilson Badger, Kirkwood, MO (US); Brigitte Martineau, St. Louis, MO (US); Robert Carvalho, Ballwin, MO (US)

(73) Assignee: Nestec, Ltd., Vevey (CH)

( * ) Notice: Subject to any disclaimer, the term of this patent is extended or adjusted under 35 U.S.C. 154(b) by 0 days.

(21) Appl. No.: 09/882,389

(22) Filed: Jun. 15, 2001

(51) Int. Cl.⁷ .................................................. A23K 1/18
(52) U.S. Cl. ........................................ 702/32; 426/805
(58) Field of Search ........................... 700/117; 702/31, 702/32, 19, 22, 30; 426/531, 805

(56) References Cited

U.S. PATENT DOCUMENTS

| | | | |
|---|---|---|---|
| 5,340,211 A | * | 8/1994 | Pratt .............................. 222/57 |
| 6,060,093 A | * | 5/2000 | Davis et al. ................. 426/491 |
| 6,115,692 A | * | 9/2000 | Liu et al. ......................... 705/8 |
| 6,156,355 A | * | 12/2000 | Shields et al. ................. 426/61 |
| 6,254,910 B1 | | 7/2001 | Paluch |
| 6,280,779 B1 | * | 8/2001 | Nadeau et al. .................. 426/2 |
| 6,358,546 B1 | * | 3/2002 | Bebiak et al. .................. 426/2 |
| 2002/0081356 A1 | * | 6/2002 | Bebiak et al. ............... 426/232 |

FOREIGN PATENT DOCUMENTS

WO  WO 200247473 A2 * 6/2002 ............ A01K/5/00

OTHER PUBLICATIONS

Business Wire, "Nature's Recipe Revolutionizes Pet Nutrition With Group Specific Formulas for Dogs", Jan. 22, 1998.*

Internet Web Page at www.domit.com.br/OptxDescE.htm entitled "OptiMix 3.1 Feed Formulation S/W", unknown date.*

* cited by examiner

*Primary Examiner*—Patrick Assouad
(74) *Attorney, Agent, or Firm*—Armstrong Teasdale LLP (57) ABSTRACT

A method for creating a customized pet food additive formula for a pet includes receiving, through an electronic interface, a user input including an individual pet profile for the pet, receiving an analysis from a biological sample of the pet, and electronically processing the individual pet profile and the biological sample analysis to create a pet food additive formula utilizing information obtained from the user input individual pet profile and the biological sample analysis.

81 Claims, 5 Drawing Sheets

METHODS AND APPARATUS FOR CUSTOMIZING PET FOOD

BACKGROUND OF THE INVENTION

This invention relates generally to methods for manufacturing pet foods, and more particularly, to a process for manufacturing a pet food customized to the health and nutrition requirements of an individual pet.

Retail pet food manufacturers typically manufacture their pet foods in large quantities and in only a limited number of formulations. Most manufacturers offer for example, dog food in several flavors, and in a puppy formula, an adult dog formula, and a mature or inactive dog formula. Some manufacturers offer breed specific or size-specific formulas. In addition, some manufacturers offer more specialized formulas for dogs having specific food allergies or nutrient responsive diseases. Similarly, retail cat food is typically offered in a limited variety of formulas having different flavors or for different stages of development. However, all of the above described food selections are for a totally pre-made product and hence the range of pet food choices is not necessarily compatible with the highly variable preferences and dietary requirements of individual pets. Thus, making a selection to suit a particular pet's dietary needs is sometimes difficult and sub-optimal. For example, an individual pet may have specific dietary requirements because of an existing illness or disease, or because of a genetic predisposition towards a particular disease. Further, the existing variety of pet food choices typically available at, for example, retail outlets, makes it difficult for pet owners to choose the food which most closely meets their own pet's nutrient needs. In addition, once a food is chosen, knowing how to feed the food correctly can be difficult.

BRIEF SUMMARY OF THE INVENTION

In one aspect of the invention, a method for manufacturing a pet food for a pet comprises obtaining an individual pet profile for the pet, obtaining an analysis from a biological sample of the pet, processing the individual pet profile and the biological sample analysis to create a first pet food formula specific to the user input individual pet profile and the biological sample analysis, and manufacturing the pet food according to the first pet food formula.

In another aspect of the invention, a method for manufacturing a pet food for a pet comprises obtaining an individual pet profile for the pet, processing the individual pet profile to create a first pet food formula specific to the user input individual pet profile, and manufacturing the pet food according to the first pet food formula. The method further comprises obtaining a biological sample from the pet after the pet has been eating the pet food manufactured according to the first pet food formula, analyzing the obtained biological sample to obtain information, processing the obtained biological sample analysis information in combination with the individual pet profile to create a second pet food formulation for the pet and manufacturing the pet food according to the second pet food formulation.

In a further aspect of the invention, a method for customizing pet food for a pet comprises receiving, through an electronic interface, a user input comprising an individual pet profile for the pet, receiving an analysis from a biological sample of the pet, electronically processing the individual pet profile and the biological sample analysis to create a first pet food formula utilizing information obtained from the user input individual pet profile and the biological sample analysis, and manufacturing a pet food according to the first pet food formula.

In a still further aspect of the invention, a method for customizing a pet food for a pet comprises receiving, through an electronic interface, a user input comprising an individual pet profile for the pet, electronically processing the individual pet profile to create a first pet food formula specific to the user input individual pet profile, and manufacturing the pet food according to the first pet food formula. The method further comprises receiving an analysis from a biological sample of the pet, electronically processing the individual pet profile and the biological sample analysis to create a second pet food formula utilizing information obtained from the user input individual pet profile and the biological sample analysis, and manufacturing a pet food according to the second pet food formula.

In another aspect of the invention, a system for manufacturing pet food comprises a computer, and a user interface including a data entry system. The user interface is coupled to the computer and is configured to prompt a user at the user interface to enter information regarding an individual pet profile of the pet. The computer is configured to receive the individual pet profile information from the user. The computer is also configured to receive information regarding an analysis from a biological sample of the pet. The computer is further configured to process the individual pet profile and the biological sample analysis to create a first pet food formula utilizing information obtained from the user input individual pet profile and the biological sample analysis. The system also comprises a food manufacturing apparatus. The computer is further configured to utilize the first pet food formula to generate at least one control signal to control the food manufacturing process apparatus according to the first pet food formula.

In yet another aspect of the invention, a system for manufacturing pet food for a pet comprises a computer and a user interface including a data entry system. The user interface is coupled to the computer and is configured to prompt a user at the user interface to enter information regarding an individual pet profile of the pet. The computer is configured to receive the individual pet profile information from the user and process the individual pet profile to create a first pet food formulation specific to the user input individual pet profile. The system further comprises a food manufacturing apparatus. The computer is further configured to utilize the first pet food formula to generate at least one control signal to control the food manufacturing process apparatus according to the first pet food formula. The computer is also configured to receive information regarding an analysis from a biological sample of the pet and process the individual pet profile and the biological sample analysis to create a second pet food formula utilizing information obtained from the user input individual pet profile and the biological sample analysis. The computer is further configured to utilize the second pet food formula to generate at least one control signal to control the food manufacturing process apparatus according to the second pet food formula.

In another aspect of the invention, a method is provided for creating a pet food formula for a pet. The method comprises obtaining an individual pet profile for the pet, obtaining an analysis from a biological sample of the pet, and processing the individual pet profile and the biological sample analysis to create a first pet food formula specific to the user input individual pet profile and the biological sample analysis.

In another aspect of the invention, a method is provided for creating a pet food product formula for a pet. The method comprises obtaining an individual pet profile for the pet, processing the individual pet profile to create a first pet food product formula specific to the user input individual pet profile, obtaining a biological sample from the pet after the pet has been eating a pre-manufactured basal kibble mixed with a pet food product manufactured according to the first pet food formula, analyzing the obtained biological sample to obtain information, and processing the obtained biological sample analysis information in combination with the individual pet profile to create a second pet food product formulation for the pet.

In another aspect of the invention, a method is provided for creating a customized pet food additive formula for a pet. The method comprises receiving, through an electronic interface, a user input comprising an individual pet profile for the pet, receiving an analysis from a biological sample of the pet after the pet has been eating a pet food manufactured according to the first pet food formula, and electronically processing the individual pet profile and the biological sample analysis to create a pet food additive formula utilizing information obtained from the user input individual pet profile and the biological sample analysis.

In another aspect of the invention, a method is provided for customizing a pet food formula for a pet. The method comprises receiving, through an electronic interface, a user input comprising an individual pet profile for the pet, electronically processing the individual pet profile to create a first pet food formula specific to the user input individual pet profile, receiving an analysis from a biological sample of the pet, and electronically processing the individual pet profile and the biological sample analysis to create a second pet food formula utilizing information obtained from the user input individual pet profile and the biological sample analysis.

In another aspect of the invention, a system is provided for creating a pet food formula for a pet. The system comprises a computer and a user interface including a data entry system, the user interface coupled to the computer and configured to prompt a user at the user interface to enter information regarding an individual pet profile of the pet. The computer configured to receive the individual pet profile information from the user. The computer also configured to receive information regarding an analysis from a biological sample of the pet. The computer further configured to process the individual pet profile and the biological sample analysis to create a first pet food formula utilizing information obtained from the user input individual pet profile and the biological sample analysis.

In another aspect of the invention, a system is provided for creating a pet food formula for a pet. The system comprises a computer and a user interface including a data entry system. The user interface coupled to the computer and configured to prompt a user at the user interface to enter information regarding an individual pet profile of the pet. The computer configured to receive the individual pet profile information from the user and process the individual pet profile to create a first pet food formulation specific to the user input individual pet profile. The computer also configured to receive information regarding an analysis from a biological sample of the pet and process the individual pet profile and the biological sample analysis to create a second pet food formula utilizing information obtained from the user input individual pet profile and the biological sample analysis.

In another aspect of the invention, a method is provided for suggesting a pet food for a pet. The method comprises obtaining an individual pet profile for the pet, obtaining a biological sample from the pet, analyzing the obtained biological sample to obtain information, processing the individual pet profile, suggesting a pre-manufactured kibble that correlates with the processed pet profile, suggesting a pre-manufactured additive that correlates with the processed pet profile, and providing a set of feeding instructions for the pet.

In another aspect of the invention, a method is provided for customizing a pet food for a pet. The method comprises obtaining an individual pet profile for the pet, obtaining a biological sample from the pet, analyzing the obtained biological sample to obtain information, processing the individual pet profile to create a pet food additive formula, suggesting a pre-manufactured kibble that correlates with the processed pet profile, and preparing a pet food additive derived from the created pet food additive formula.

In another aspect of the invention, an apparatus is provided for customizing a pet food product for a pet. The apparatus comprises means for obtaining an individual pet profile for the pet, means for obtaining a biological sample analysis of the pet, means for processing the individual pet profile and the biological sample analysis, and means for creating a pet food product in accordance with the processed individual pet profile and the biological sample analysis.

In another aspect of the invention, a method is provided for obtaining a customized pet food product for a pet. The method comprises providing information pertaining to an individual pet profile of the pet, providing a biological sample of the pet, and obtaining a pet food product, the pet food product determined from an analysis of the provided information and the provided sample.

DETAILED DESCRIPTION OF THE INVENTION

Exemplary embodiments of apparatus and methods for customizing pet products are described below. The systems and methods facilitate the manufacture of a customized product that is directed to the specific needs of an individual pet. As used hereinafter, pet product includes pet foods as well as pet food components. Although the pet products may include food components that are manufactured in bulk, i.e., pre-made, the pre-made components are combined with custom made products to produce an end product that is customized to the particular needs of an individual pet. Thus, the phrase customized product includes products that have no pre-made food components as well as products that include pre-made food components and custom made additives. In addition, although the method is often described in terms of a complete process, it should be understood that any portion of the process can be used separately or in combination with any other portion of the process described hereinafter.

Figure 1:
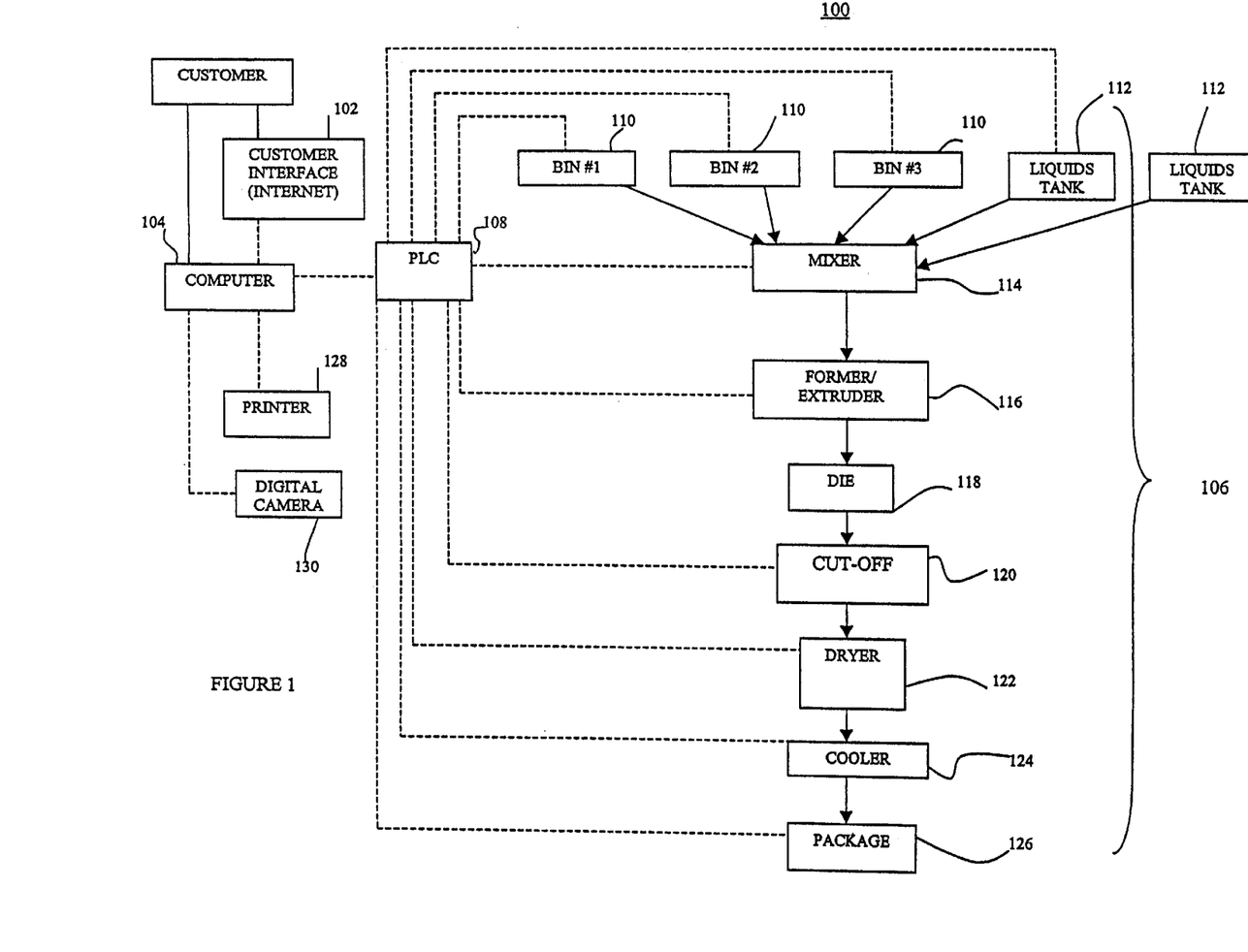
FIG. 1 is a schematic illustration of an apparatus for manufacturing a customized pet food.

FIG. 1 is a schematic illustration of an exemplary embodiment of an apparatus 100 for manufacturing a customized pet food. Apparatus 100 includes an electronic user interface 102 and a main computer 104 which is electronically coupled to user interface 102. Apparatus 100 also includes a manufacturing and packaging apparatus 106 electronically coupled to main computer 104. In one embodiment, user interface 102 is remote from main computer 104. In an alternative embodiment, user interface 102 is local relative to main computer 104. User interface 102 includes a data entry system such as a desktop computer, or an input device such as a keyboard, touch screen, or card reader, and an output device such as a monitor. In another embodiment, user interface 102 is a voice-activated telephone system. User interface 102 is coupled to main computer 104 through standard computer cables, a phone line or a dedicated computer network cable, which transmits user input to main computer 104 for processing.

Main computer 104 may be, for example, a typical, commercially available personal computer with networking capability. Main computer 104 generates control signals for controlling a pet food manufacturing apparatus 106. In one embodiment, for example, main computer 104 is a computer network server such as a web server which supports a web "page" written in Hyper-text Mark-up Language (HTML) or a web site including multiple such "pages". The web page or web site is the electronic input to user interface 102.

In one embodiment, main computer 104 generates the control signals for apparatus 106 through a programmable logic controller (PLC) 108. In one embodiment, PLC 108 is a stand alone unit such as a Modicon model 984-E245 controller, available from Schneider Automation, Inc., North Andover, Mass. In an alternative embodiment, PLC 108 is integrated with main computer 104. However, it should be understood to those skilled in the art that PLC 108 may be any of a variety of commonly known and available programmable circuits, and the below described methods are not limited to practice only in connection with those integrated circuits referred to in the art as programmable logic controllers. Therefore, and as used herein, the term programmable logic controller refers to microprocessors, microcontrollers, application-specific integrated circuits, and other programmable circuits. In addition, to the extent the present application is directed to the methods as described below in more detail, it should be understood that such methods should not be limited to a particular food manufacturing apparatus 106.

PLC 108 is programmed to receive an input signal from main computer 104 and to produce output control signals to food manufacturing apparatus 106. The input signal from main computer 104 represents the customized pet food formula created according to the individual pet profile of the pet and nutritional data stored in the database. In an alternative embodiment, the input signal from main computer 104 represents the customized pet food formula created according to the individual pet profile of the pet in combination with the biological sample analysis. The output control signals represent a set of manufacturing instructions to food manufacturing apparatus 106, which is capable of operating automatically upon the output control signal from PLC 108. For example, the output signals include start, stop and timing directions to the various components of manufacturing apparatus 106 as described below, and generally controls and directs the manufacture of the pet food by apparatus 106. PLC 108 is further programmed to receive feedback signals from manufacturing apparatus 106, including signals confirming that proper types and amounts of ingredients have been added to the pet food, and signals of equipment malfunctions. In an alternative embodiment, PLC 108 is further coupled to alarms (not shown) which are activated by malfunction signals from manufacturing apparatus 106.

In one embodiment, food manufacturing apparatus 106 is a unit which is sized so that apparatus 106 can be placed on a dolly, cart or the like and transported through typical commercial or industrial doorways. Apparatus 106 is powered by at least one of a 110V and a 208V source from electrical outlets. The unit, in one embodiment, includes water hook-ups to facilitate cleaning of the unit, and generally the unit's capacity is scaled according to the requirements of the facility which houses the unit. For example, a veterinary office would typically prefer a smaller unit, while a large retail grocery store, or any retailer located remotely from an ingredient supplier, would typically prefer a larger unit so that refills are required less frequently. Apparatus 106 generally includes a plurality of dry ingredient bins 110 for storing dry, pre-cooked or uncooked pet food ingredients, at least one liquids tank 112, a mixer 114, a former/extruder 116, a die 118, a cut-off device 120, a dryer 122, a cooler 124, and a packager 126.

Apparatus 100 includes bins 110 placed side by side atop the remaining components of food manufacturing apparatus 106, and each bin has an opening at the bottom which is covered by a volume-regulating element, such as a rotary lock, which can be opened and closed by signals from PLC 108, to regulate the gravity-fed, measured addition of dry ingredients to the pet food. Bins 110 store a variety of dry materials typically used in manufacturing pet foods, such as, for example, corn, wheat, corn gluten meal, meat meal, and poultry meal, or precooked mixes of typical ingredients. Bins 110 can be fabricated of transparent material so that the user can observe the dry ingredients as they are added to the pet food. In one embodiment, bins 110 are sealed to protect against infestation.

A plurality of liquids tanks 112 are provided for storing and measuring liquid ingredients, such as, for example, fat, tallow, water or liquid animal digest. In alternative embodiments, heating devices (not shown) are coupled to the liquids tank to prevent solidification of some liquid ingredients such as fat and tallow. Liquids tanks 112 and bins 110 are coupled to mixer 114 and deliver the dry ingredients and liquids to mixer 114. Mixer 114, in one embodiment, is a rotating blade mixer as known in the art and liquids tanks 112 contain pumps (not shown) which are controlled by the output signals from PLC 108, so that liquids tanks 112 deliver measured amounts of liquid ingredients to mixer 114. Subject to the control signals from PLC 108, mixer 114 mixes the dry and liquid ingredients together in preparation for extrusion. For example, the control signals from PLC 108 regulate the speed of the rotating blades, and the duration of the mixing step. A weighing system (not shown) coupled to mixer 114 provides weight information to confirm the amounts of ingredients as they are added. Mixer 114 includes a feeding device (not shown) to deliver the mixed ingredients to former/extruder 116.

Former/extruder 116 is any former or extruder as well known in the art which develops pressure with or without heat to process and shape the mixed ingredients. For example, former/extruder 116 is a twin screw cold-forming extruder. Former/extruder 116 is coupled to die 118 through which the processed ingredients are forced, under conditions of elevated pressure, to form a continuous strand or rope of product. Die 118 includes a restricted opening configured to determine the final shape and size of the food product. For example, die 118 is one of a circular shape, a square shape, an X-shape, a donut-shape, and a fish-shape.

Apparatus 100 further includes a bulk conveyor (not shown), such as a conveyor belt, which extends through dryer 122 and cooler 124. In one embodiment, dryer 122 is a standard pizza oven and the speed of the conveyor is controlled by PLC 108, according to user input, to adjust the drying time of the manufactured food so that a desired moisture level is obtained. Cooler 124 is, for example, an enclosure coupled to dryer 122 which houses multiple fans.

Apparatus 100 also includes a packaging apparatus 126 for packaging food in a sealable container such as a plastic bag, a plastic-lined paper bag, a box, a bottle or a jar, which provides protection during storage from moisture gain or loss, and infestation, and identifies and labels the product. Packaging apparatus 126 is, in one embodiment, a shroud or feed tube attached to cooler 126. In an exemplary embodiment, main computer 104 is also coupled to a printer 128 which prints labels, such as self-adhesive labels, for affixing to the food container.

Figure 2:
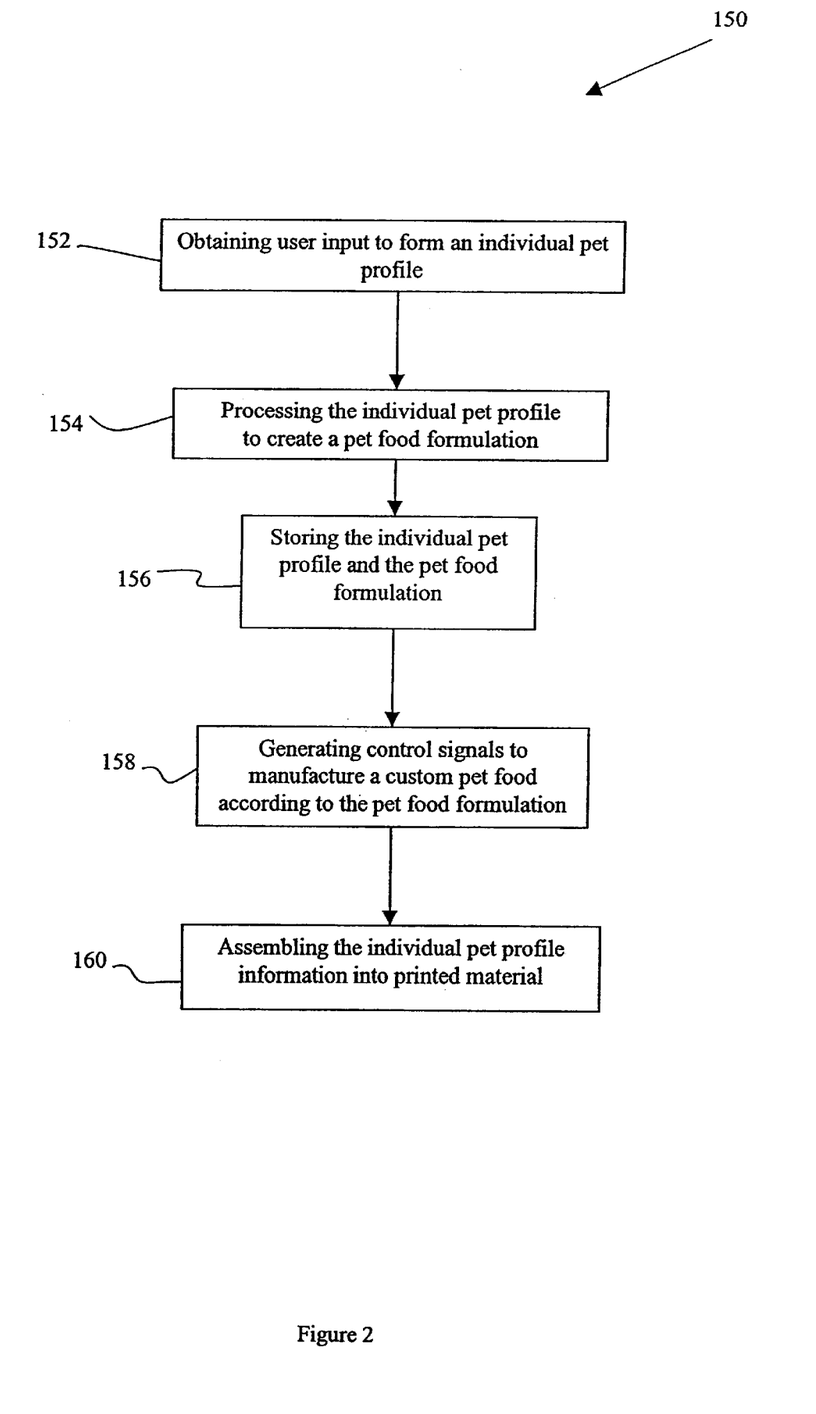
FIG. 2 is a flow chart illustrating a method for manufacturing a customized pet food in accordance with one embodiment of the invention.

FIG. 2 is a flow chart illustrating a method 150 for manufacturing a custom pet food. In one embodiment, method 150 generally includes obtaining user input through electronic user interface 102 (shown in FIG. 1), processing the input with stored data on main computer 104 (shown in FIG. 1), and generating control signals to control the operation of food manufacturing and packaging apparatus 106 (shown in FIG. 1) according to the user input. The user input is representative of an individual pet profile which includes nutritional and health information on a pet, and individual preferences of the pet and pet owner regarding finished product characteristics such as flavor, form, texture and the like.

It should be understood that, to the extent the present application is directed to the methods as described below in more detail, such methods should not be limited to a particular food manufacturing apparatus. It should be further understood that the methods described herein can be implemented in a variety of ways, including the use of software which runs on main computer 104 and controls the real-time manufacturing of the pet food. In addition, it should be understood that the user input can occur through any means, electronic or otherwise and the processing can occur through any means, electronic or otherwise. For example, method 150 may be practiced by administering a written or verbal questionnaire to a user or customer to form the individual pet profile, using the individual pet profile to generate a customized pet food formula, and manufacturing the customized pet food with manual control of the operation of food manufacturing and packaging apparatus 106.

In an exemplary embodiment, a user such as a consumer connects to main computer 104 via a computer network such as the Internet, from a home computer connected to a home phone line. Alternatively, the user uses a user interface local relative to main computer 104. Both main computer 104 and user interface 102 are located, for example, in a retail grocery store. Main computer 104 provides an electronic input to user interface 102, which input prompts a user at user interface 102 to answer a series of questions to form the individual pet profile of the pet. The answers from the user are communicated electronically to main computer 104, and main computer 104 processes 154 the information contained in the individual pet profile to create a pet food formulation specific to the pet and in accordance with the individual pet profile of the pet. In one embodiment, the user selects radio buttons on a web page to answer questions regarding the individual pet profile.

The individual pet profile is composed of answers to questions pertaining to, but not limited to, a pet's name, species, age, weight, gender, breed, spayed/neutered, activity level, breeding status, medical history and genetic information, current health status, body condition, feeding method, snack schedule and flavor preferences. In addition, the individual pet profile includes indications regarding, for example, the preferences of the pet, or the pet's owner, regarding form, flavor, shape and texture. Further, the individual pet profile also includes information regarding the season, or time of year. The information for the season and the time of year may either be obtained through questions asked to the user, or through an internal clock on computer 104. In one embodiment, the user is a consumer such as a pet owner. In an alternative embodiment, the user is a pet care provider such as a veterinarian or veterinary technician who administers a written questionnaire to the pet owner, and then enters the data into user interface 102, or directly into main computer 104.

Main computer 104 receives and processes the information contained in the individual pet profile and stores the information. In addition, main computer 104 utilizes information obtained from an analysis of a biological sample of the pet to obtain additional information regarding the pet. The information regarding the biological sample analysis can occur by any means. In an exemplary embodiment, the additional information regarding the biological sample analysis is pertinent to determining the pet's individual ability to react to specific dietary nutrients or ingredients and thereby change the health status of the pet (including, but not limited to, stool quality, immune status, oral/dental health, skeletal health, skin and coat condition). In one embodiment, the analysis of the biological sample is obtained at the same time as the pet profile information is obtained. In an alternative embodiment, the analysis of the biological sample is obtained after the pet has been eating the pet food manufactured utilizing the pet food formulation created by main computer 104. The analysis provides information that enhances the individual pet profile information and is used to modify the customized pet food formulation by adding and/or removing specific nutrients from the customized pet food formulation to make the new formulation even more customized for the pet. In one embodiment, the additional nutritional and biological analyses information is conveyed to the pet's veterinarian to recommend potential therapeutic components to the diet or a therapeutic treatment if appropriate. In the exemplary embodiment, the biological sample includes, but is not limited to, at least one of stool, hair, blood, saliva, tissue, and DNA.

The biological sample analysis, in one embodiment, enhances the individual pet profile assembled via the questionnaire. The analysis determines a pet's individual reaction to a diet and the pet's ability to change its health status (including, but not limited to stool quality, immune status, oral/dental health, skeletal health, skin and coat health) which may be different than a reaction of another pet in the same category to the same diet. For example, in creating pet foods for the "average" dog, digestion tests are typically conducted on a statistically large group of animals and their reactions averaged. The predictions are made on how these diets may fare for other similar dogs. Individual variations are thus excluded when foods are created for the "average" pet. The above described method, however, brings the benefits of these tests, or a subset of these tests, to the individual pet to create a food specifically to address the needs and abilities of the individual pet.

Main computer 104 further generates control signals which control operation of apparatus 108. More specifically, main computer 104 includes a database that stores 156 the individual pet profile and nutritional information. The nutritional information is combined with the individual pet profile to create a customized pet food formula specific to the individual pet which is also stored in the database. Main computer 104 then generates 158 control signals for apparatus 108 according to the customized pet food formula. In addition, main computer 104 can be programmed to assemble 160 the user input and nutritional data into printed material. In an exemplary embodiment, the printed material includes customized pet feeding and care information for the individual pet, along with an ingredient statement, guaranteed analysis of the pet food, and a product label. In alternative embodiments, the printed material may also include recommendations regarding the use of treats and supplements, exercise of the pet, and veterinary care. Additionally, main computer 104 is programmed to manage ingredient and supplies inventories, and to generate customer notices or reminders for food re-orders, pet birthday cards, veterinary visits, and special promotions.

To manufacture a food in accordance with the above method, the created pet food formulation is utilized by computer 104 to direct apparatus 106 regarding the proper ingredients to add and the proper amounts of each added ingredient. The ingredients are mixed and processed within former/extruder 116 (shown in FIG. 1) and are forced through die 118 (shown in FIG. 1) to form a strand of product. The strand is segmented into discrete particles, pieces or kibbles (hereinafter referred to as kibbles) by cut-off device 120 (shown in FIG. 1), such as a rotating cutting knife, as product is extruded.

The moisture level of the kibbles is controlled by transporting the kibbles to dryer 122 (shown in FIG. 1) on the conveyor. More specifically, the desired moisture level, which is generally about 5% to about 15% for dry pet food, and about 15% to about 40% for semi-moist pet food, is achieved by selecting an internal temperature for dryer 122 and then controlling the dwell time of the kibbles in dryer 122 by adjusting the speed of the conveyor. For example, for a user who has indicated a preference for a semi-moist pet food product, PLC 108 controls the speed of the conveyor so that the dwell time of the kibbles in dryer 122 is less than about 1 minute. For a dryer pet food product, as per the user preference, PLC 108 controls the speed of the conveyor so that the dwell time of the kibbles in dryer 122 is about 5 to about 15 minutes. Generally, the drying step renders the product less susceptible to spoilage than if the product was left with the higher moisture level required for extrusion. In one embodiment, the drying step is followed by a spraying or coating step in which a coating system is used to apply fats, oils or other liquids or powders onto the product.

After the drying step, and subject to the control signals from PLC 108, the hot kibbles are then transferred by the conveyor to cooler 124 (shown in FIG. 1), to reduce the product temperature. Again, the signals from PLC 108 to the conveyor control the dwell time of the kibbles in cooler 124, and also control operation of the fans. During the dwell time within cooler 124, the kibbles are cooled to a temperature between about ambient temperature and about 120° F. by the air flow provided by the fans. In one embodiment, the kibbles are cooled to about 100° F. Generally, this step is included before packaging to prevent further condensation inside the package, which forms wet spots on the package and increases the chances of product spoilage.

The dry, cooled kibbles are then conveyed by the conveyor to packaging apparatus 126 (shown in FIG. 1) which packages the product into discreet packages ready for transport by the user. In addition, a label is created and printed that identifies the individual pet for which the food was manufactured, and lists the product formula, ingredient list, date of manufacture, and the like. In an alternative embodiment, main computer 104 is further coupled to a digital camera 130 (shown in FIG. 1) which captures an electronic image of the individual pet, and transmits the image to main computer 104 to generate a photo label of the pet for the food package, which is printed by printer 128 (shown in FIG. 1) on a label as described above. Printer 128 may also be used to produce printed material such as a pamphlet or flyer having pet care information and instructions including, for example, a description of the customized pet food formula, feeding recommendations including specific recommendations regarding amount and feeding methods, recommendations for treats and supplements, and recommendations on veterinary care.

Figure 3:
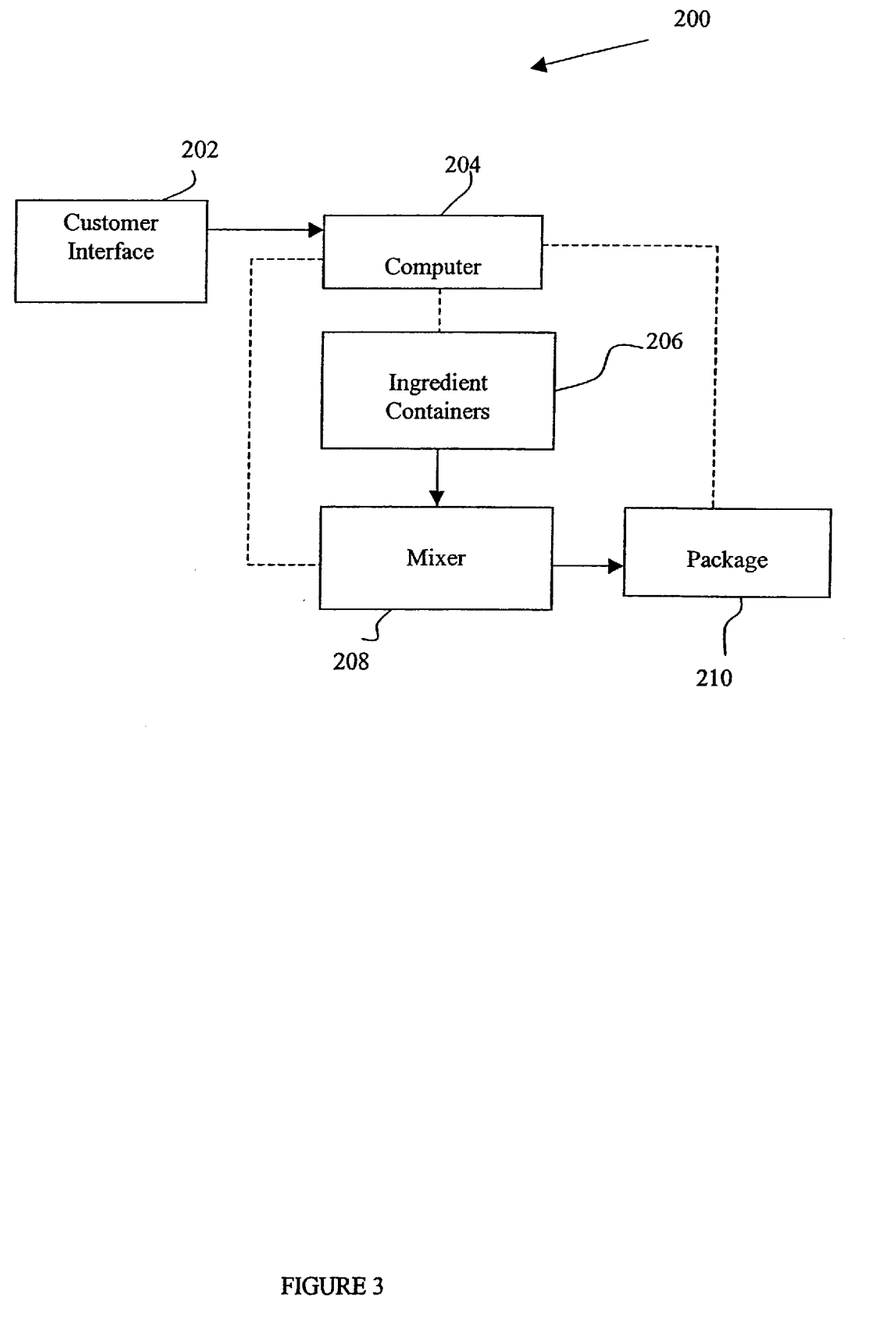
FIG. 3 is a schematic illustration of an apparatus for producing a multiple part customized food.

FIG. 3 is a schematic illustration of an exemplary embodiment of an apparatus 200 for producing a custom pet food product by matching a sauce with a base kibble. Apparatus 200 includes a customer interface 202 connected to a computer 204 for inputting a pet profile into computer 204. Computer 204 directs the proper combination of ingredients contained within ingredient containers 206 into a mixer 208. The mixed product is then packaged in a package 210.

Figure 4:
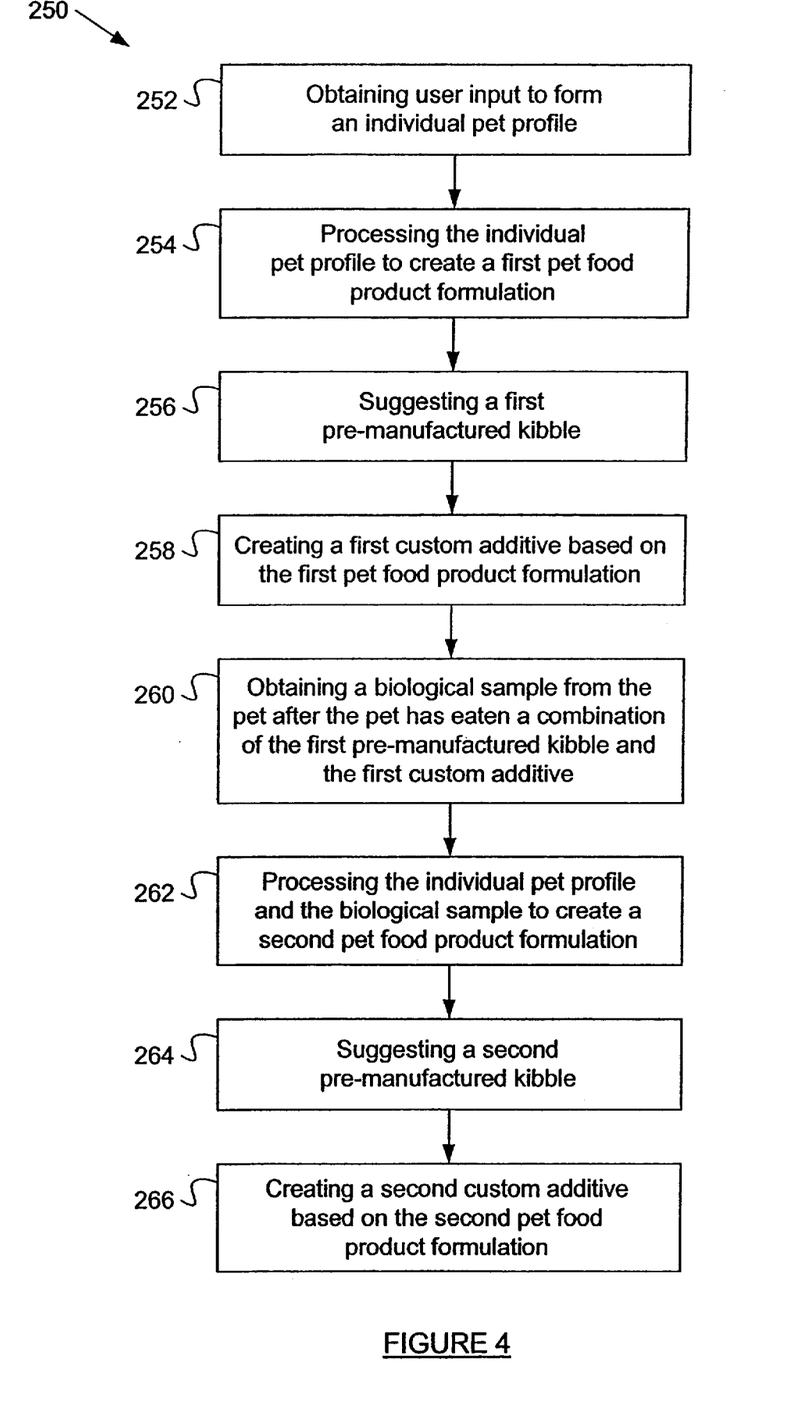
FIG. 4 is a flow chart illustrating a method for producing a customized pet product in accordance with an alternative embodiment of the invention.

FIG. 4 is a flow chart of a method 250 for producing a custom pet food in accordance with an alternative embodiment of the invention. Method 250 generally includes obtaining user input, processing the obtained input, selecting an appropriate pre-manufactured kibble based on the obtained input, and preparing a custom food additive in accordance with the obtained user input.

The user input obtained is representative of an individual pet profile which includes nutritional and health information on a pet, and individual preferences of the pet and pet owner regarding finished product characteristics such as, size, shape, flavor, form, texture and the like. Although method 250 is described below in the context of an electronic system, it should be understood that the user input can occur through any means, electronic or otherwise and the processing can occur through any means, electronic or otherwise. For example, method 250 may be practiced by administering a written or verbal questionnaire to a user or customer to create the individual pet profile, using the individual pet profile to generate a customized pet product formula, and producing the customized pet product.

In an exemplary embodiment, a user such as a consumer connects to a computer, such as main computer 104 shown in FIG. 1, via a computer network such as the Internet, from a home computer connected to a home phone line. Alternatively, the user uses a user interface local relative to the computer. In one embodiment, the computer and the user interface are located in a retail grocery store. The computer provides an electronic input to the user interface. The user input is obtained 252 to form an individual pet profile by prompting a user at the user interface to answer a series of questions to form the individual pet profile of the pet. The answers from the user are communicated electronically to the computer which processes the information contained in the individual pet profile. The processed information is used to create 254 a first pet food product formulation for a first pet food product. In one embodiment, the custom pet food product includes a pre-manufactured kibble and a custom pet food additive. The computer suggests 256 a first pre-manufactured kibble from a number of possible pre-manufactured kibbles and creates 258 a first pet food additive based on the pet food product formulation specific to the pet and in accordance with the individual pet profile of the pet. In an alternative embodiment, the pet food product includes a pre-manufactured kibble and a pre-manufactured additive, such as a sauce. The computer suggests a particular pre-manufactured kibble from a number of possible pre-manufactured kibbles and suggests a particular pre-manufactured sauce from a number of possible pre-manufactured sauces.

The individual pet profile is composed of answers to questions pertaining to, but not limited to, a pet's name, species, age, weight, gender, breed, spayed/neutered, activity level, breeding status, medical history and genetic information, current health status, body condition, feeding method, snack schedule and flavor preferences. In addition, the individual pet profile can include indications regarding, for example, the preferences of the pet, or the pet's owner, regarding form, flavor, shape and texture. Further, the individual pet profile may also include information regarding the season, or time of year. In one embodiment, the user is a consumer such as a pet owner. In an alternative embodiment, the user is a pet care provider such as a veterinarian or veterinary technician who administers a written questionnaire to the pet owner, and then supplies the data to the computer. The computer receives and processes the information contained in the individual pet profile and stores the information in a database.

In addition to the individual pet profile created based on user input, the user is also requested to input information obtained from a biological sample of the pet. The computer utilizes information obtained from the biological sample analysis to obtain additional information regarding the pet. The information regarding the biological sample analysis can be obtained by any means and is not limited to electronic means. In an exemplary embodiment, the additional information regarding the biological sample analysis is pertinent to determining the pet's individual ability to react to specific dietary nutrients or ingredients and thereby change the health status of the pet (including, but not limited to stool quality, immune status, oral/dental health, skeletal health, skin and coat condition). In one embodiment, the analysis of the biological sample is obtained at the same time the pet profile information is obtained. In an alternative embodiment, the analysis of the biological sample is obtained 260 after the pet has eaten a combination of the first pre-manufactured kibble and the first custom additive produced in accordance with the individual pet profile information. The analysis provides information that enhances the individual pet profile information and is used to modify and refine the customized pet food product by suggesting a different pre-manufactured kibble, adding specific additive ingredients, removing specific additive ingredients, and/or changing the amount of any included additive ingredient from the pet product formulation to enable the new formulation to better meet the needs of the pet. In one embodiment, the additional nutritional and biological analyses information is conveyed to the pet's veterinarian to recommend potential therapeutic components to the diet or a therapeutic treatment if appropriate. In an alternative embodiment, the veterinarian conveys the nutritional and biological analyses information to a pet food manufacturer. In the exemplary embodiment, the biological sample includes, but is not limited to, at least one of stool, urine, hair, blood, saliva, tissue, and DNA.

The biological sample analysis determines a pet's individual reaction to a diet and the pet's ability to change its health status, including, but not limited to stool quality, immune status, oral/dental health, skeletal health, skin and coat health. The pet's individual reaction and ability to change may be different than a reaction of another pet in the same category to the same diet. For example, in creating pet foods for the "average" dog, digestion tests are typically conducted on a statistically large group of animals and their reactions averaged. The predictions are made on how these diets may fare for other similar dogs. Individual variations are thus excluded during creating foods for the "average" pet. It is these individual variations that are addressed by using either of methods 150 and 250.

The computer includes a database that stores the individual pet profile, nutritional information, and biological sample analysis information. The individual pet profile and the biological sample analysis information are processed 262 to create a second pet product formulation specific to the individual pet. In one embodiment, the nutritional information is combined with the individual pet profile and the biological sample analysis information to create the pet food product formulation specific to the individual pet, which is also stored in the database. In addition, the computer is programmed to assemble the user input and nutritional data into printed material. In an exemplary embodiment, the printed material includes customized pet feeding and care information for the individual pet, along with an ingredient statement, guaranteed analysis of the pet food, and a product label. In alternative embodiments, the printed material may also include recommendations regarding the use of treats and supplements, exercise of the pet, and veterinary care.

In one embodiment, the second pet food product includes a second pre-manufactured kibble and a second custom pet food additive. The computer suggests 264 a second pre-manufactured kibble from a number of possible pre-manufactured kibbles and creates 266 a second pet food additive based on the pet food product formulation specific to the pet and in accordance with the individual pet profile of the pet. In an alternative embodiment, the second pet food product includes a pre-manufactured kibble and a pre-manufactured additive, such as a sauce. The computer suggests a particular pre-manufactured kibble from a number of possible pre-manufactured kibbles and suggests a particular pre-manufactured sauce from a number of possible pre-manufactured sauces.

In one embodiment, the customized pet product includes a first basal portion common to many types of finished food products and also includes a second supplemental portion that incorporates additional ingredients. The additional ingredients, in one embodiment, are in the form of a sauce, a coating, a gravy, a solution, a topping, and a powder. In alternative embodiments, the additional ingredients can take other forms. The two-portion food provides a large variety of customized foods while keeping the inventory of basal ingredients and supplemental ingredients to a minimum. Only a minimal number of ingredients are utilized since a minimum number of nutrient bases (for the major categories of pet foods) can be used in conjunction with micro ingredients such as vitamins, minerals, fats, antioxidants, flavors, soluble fibers, and other functional ingredients to provide a large variety of complete, customized pet foods that address a pet's specific nutritional and other needs.

In an exemplary embodiment, the basal food portion is pre-made into kibbles and an additive is custom blended according to each pet's specific individual pet profile and biological sample analysis. A set of dog nutrient profiles, with the exception of fat, soluble fiber, and vitamin E, is created to satisfy the macronutrient needs of different dogs. For example, a set of 10 profiles is utilized to create 10 formulas, e.g., F1 through F10. These formulas are utilized to manufacture, according to known extrusion methods, pre-made kibbles which are packaged into packages, such as bags.

Next, an additive formulation, such as a sauce, is formulated in a number of varieties, e.g., S1 through S25, which provide the required amounts of fat, fiber, and vitamin E. The additive formulations are created to make each of the bases F1 through F10 complete and balanced when mixed with an appropriate additive in an appropriate amount. Additives S1 through S25 are made in any of the consumer preferred flavors and with inclusions of other desired micronutrients. Thus, the total number of additives increases by a factor such as four.

For example, additive S3 (at 12.5% of total) is combined with formula F5 (at 87.5% of total) to create a complete and balanced food that provides all the nutrient needs of a specific pet. Additive S3 is, for example, a sauce having a salmon flavor and other desired micronutrients, such as extra vitamin E, for a stressful dog. Multiple additives can be formulated to be compatible with multiple pre-made bases.

In one embodiment, the pre-made bases, F1 through F10, are packaged in bags and brought to a store. Components, such as flavors, micro-nutrients, fats, soluble fiber, and preservatives, to make the additives S1 through S25 are also brought to the same store in containers, such as dispensing bottles. As a customer's requirements are determined, a specific base, such as F3, is selected and an additive formulation, say F5, in a customer chosen flavor, say tuna flavor, is created on site. Using the dispensing bottles, the additive is mixed in a bottle, sealed, and given to the consumer with proper mixing and feeding instructions. The user combines the kibbles with the additive to provide a customized pet food to the pet. In one embodiment, the additive is one of a sauce, a powder, a coating, a thickener, a topping and a gravy. In alternative embodiments, the additive is a combination of two or more of the above listed additives.

The additives are formulated such that when the additives are combined with the kibbles, a complete, balanced and customized nutritious product is supplied. In one embodiment, the additives are manufactured by an operator in accordance with information obtained from the pet's individual pet profile.

The ratio of additives to kibbles is an important factor in supplying a complete and nutritious food to pets. The macronutrients in a pet food (such as the protein, carbohydrates, fat and moisture) are provided to a large extent by the base kibbles. However, the caloric and fat content of the combined food can be adjusted by manipulating the fat content of the additives. Thus, for an additive added at 12.5% of the total pet food (base plus additive), the fat content of the additive is varied between 15% and 70%. This variation allows addition of between 2% and 11% fat, and selecting the appropriate level of fat in the additive allows fat levels of the combined pet food to vary between about 4% and 20% which is a typical range for pet foods.

All pets need the vitamins and minerals that make up a complete and balanced diet. These vitamins and minerals are usually sourced as premixes from vitamin suppliers and are added at typically less than 1% of the formulation. In one embodiment, these vitamins and minerals are added to the kibbles. In an alternative embodiment, for vitamins and minerals that need to be protected from high thermal processing such as extrusions, the vitamins and minerals are added to the additives instead. Higher dosages of vitamins such as Vitamin E and Vitamin C are suggested for individual dogs that are senior, active, or undergoing immune deficiency. Higher than basic levels of these vitamins can be delivered through addition of vitamins in the additives, typically at low levels such as from 0 to 0.5%.

In addition, if dogs need additional levels of soluble or insoluble fiber, the fiber is delivered through the additives in amounts typically ranging between 0.1% and 1.0% of the total formulation, or between 0.5% and 20% of the sauce depending upon the sauce to the base kibble ratio.

Palatable coatings such as animal digests, typically used in pet food formulations, can be used to make the sauce highly palatable to the pets. These coating levels can be varied (0.5% to 10%) to compensate for the varying palatability effect of other ingredients such as fat levels. Thus, even low-calorie pet foods can be made as palatable as high-calorie foods by adding an extra amount of palatable coatings to the kibbles in a low-calorie diet.

Other specialized micronutrients, as they are discovered for their effect in pet nutrition can also be delivered through the additives as a delivery mechanism. For example, fish oil as a source of omega three fatty acids for healthy skin and coat, is included in the additives in the required quantities (such as between 0 and 5%). Alternatively, sodium acid pyrophosphate for dental and skeletal health is included in the additives in the required quantities (such as between 0 and 5%).

In addition, and in one embodiment, the additives are visually appealing and functionally stable. For example, pH lowering agents (such as phosphoric acid or sodium bisulfate and/or Sorbic acid) are added at between 1.0% and 5.0% to bring the pH to between 2.0 and 3.0 to provide a resistance to bacterial, fungal or other microbial spoilage to the additives. Additive stabilizers, for example for a sauce, such as gums or fibers are, in one embodiment, added at between 0.5% and 2.0% to make the additive components well integrated. Other flavors and colors are added at 0 to 3.0% to provide the desired flavor and color of the additive to the customer. For a sauce additive, it has been determined that adding Psyllium fiber at between 0 and 1.0% of the sauce amount binds water and prevents separation of aqueous and fat phases in the sauce.

In an alternative embodiment, the kibbles are not pre-manufactured but instead the basal food portion is pre-mixed and transported to specific locations, such as retail locations. Ingredients to make the supplemental portion are kept at each retail location. Manufacturing apparatus at each specific location are utilized to blend the appropriate supplemental ingredients with the pre-made basal portion and form a manufactured food. Thus the manufacturing process is simplified and can be diffused to many locations instead of one or a few central locations.

Figure 5:
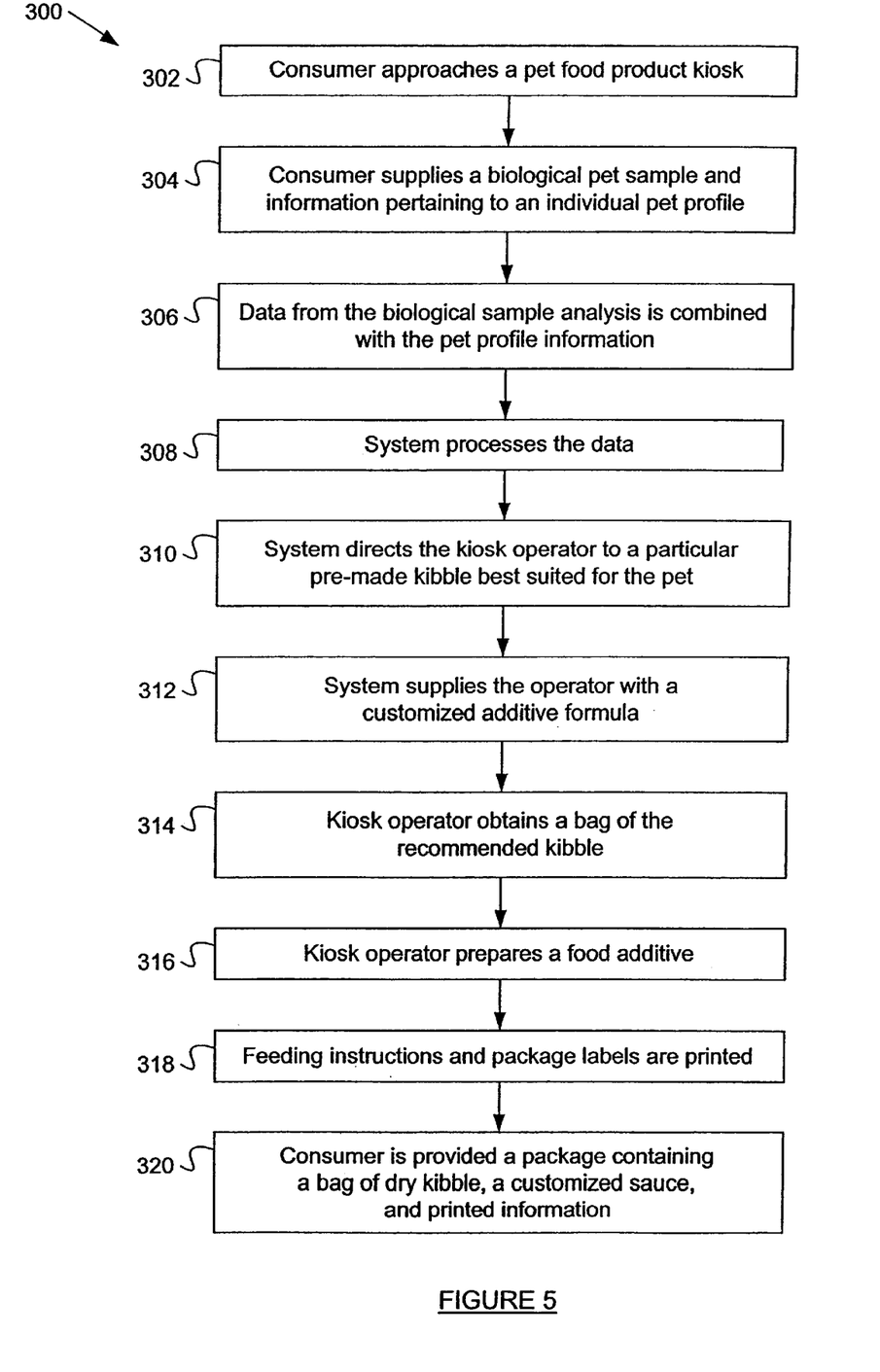
FIG. 5 illustrates a method of obtaining a customized pet food product.

FIG. 5 illustrates a method 300 of obtaining a customized pet food product. In an exemplary embodiment, a pet owner (consumer) that is a first-time purchaser of a customized pet food product approaches 302 pet food product kiosk, or booth, located in a retail location, including but not limited to, a mall, a store, a veterinarian office, a clinic, an airport, and an outdoor event. The consumer supplies 304 a biological sample (i.e., stool sample) and information pertaining to an individual pet profile. In one embodiment, the consumer supplies a completed questionnaire which is obtained in advance of the visit, such as via the Internet, in the mail or which is personally picked up at the kiosk.

In one embodiment, analytical data is obtained from the biological sample by a veterinarian/technician located on site. In an alternative embodiment, the sample is sent to a central lab for analysis. The analysis is performed on the biological sample with respect to examining several health and digestive indicators. Data from the biological sample analysis is combined 306 with the pet profile information and entered into a system including a pet food product customization model. Alternatively, the biological sample analysis is forward by the pet's veterinarian to the kiosk operator and the results are incorporated into the pet profile.

The system processes 308 the data utilizing at least one algorithm and generates a pet profile. Each profile has a unique identifying code and contains the specific customized food product and feeding instructions recommended for the specific pet. The recommended food product includes a pre-manufactured kibble and a customized additive. In one embodiment, the pre-manufactured kibble is selected from a variety of pre-manufactured kibbles and the additive is a liquid additive that is made on site, typically in the presence of the consumer. The system directs 310 the kiosk operator to the particular pre-made kibble best suited for the pet and supplies 312 the operator with a customized additive formula that has been created based upon the individual pet's profile. Alternatively, the system indicates a recommendation for the pet to see a veterinarian prior to buying a customized food, if certain "warning" signs are present in the profile. This recommendation provides the consumer with added health information about the pet between regular vet visits.

The kiosk operator then obtains 314 a bag of the recommended kibble and prepares 316 a food additive, including but not limited to a sauce, a gravy, a topping, a thickener, a powder, and a coating, utilizing the customized additive formula. In the exemplary embodiment, a sauce is made. In addition, customized feeding instructions and package labels are printed 318. The consumer is provided 320 a package containing a bag of dry food base, a bottle of customized sauce, printed information, a customized measuring scoop for the dry kibbles and a custom-selected spoon for measuring the sauce into the food bowl. Additionally, the consumer receives information about the recommended frequency and conditions of future biological sample analyses and/or profile updates for their pet.

In an alternative embodiment, the pet profile is utilized by the system to direct the kiosk operator to a pre-manufactured kibble best suited for the pet and a pre-manufactured sauce best suited for the pet. The kiosk operator provides the consumer with the appropriate pre-manufactured kibble and pre-manufactured sauce and the consumer mixes the appropriate amounts of each for the pet.

For a repeat purchase, a consumer returns to the kiosk and provides their pet's unique code to access their pet's profile. They may update/change the profile information and/or provide a new biological sample, either of which could result in a difference in the recommended food. Alternatively, the consumer leaves the profile as it is and replenishes their pet's current food supply.

Alternatively, the additive is ordered by at least one of mail, catalogue, and the Internet, and is shipped directly to the consumer's home. Then, only the pre-made bases are purchased at a retail outlet. Once the consumer receives a base formula recommendation, the consumer purchases the base wherever convenient, and the additive is shipped directly to the consumer in finished or almost finished form. In one embodiment, the consumer adds one of water and oil to the shipped sauce. In alternative embodiments, the sauce is produced either on site or off site and the production is either manual or automated.

EXAMPLE 1

A pet questionnaire is administered regarding a pet named "Chucky" at a remote manufacturing location, such as a retail store. The questionnaire is completed by Chucky's owner and the following information, among other information, is obtained about Chucky.

| Name of pet: | Chucky |
| Breed of Pet: | Golden Retriever |
| Weight: | 65 lbs |
| Age: | 4 Years |
| Gender: | Male |
| Spayed/Neutered: | Yes |
| Activity Level: | Moderate |
| Season: | Summer |
| Feeding Method: | Measured |
| Snack Schedule: | Once a day |
| Flavor Preference: | Beef |
| Body Condition: | Ideal/Fit |

Next, Chucky's owner delivers a typical stool sample of Chucky to the retail store where the feeding and care program is being administered. The following stool sample analyses of Chucky is performed.

| Moisture: | Normal |
| Texture: | High-Above Normal |
| Discomfort: | Yes |
| Particulates: | None |
| Color: | Normal |
| Mucin: | None to Normal |
| Parasites: | None |

Based on the above information, a pre-manufactured kibble is selected that is appropriate for adult, medium sized dogs with a moderate level of activity and good body condition score, the desired flavor preference and no other special health condition is selected. Next, an appropriate daily feeding amount is calculated based on the nutrient profile and "additive" selected, the weight of the dog, body condition, season of the year and snacking habit. Finally, based on stool analyses, a custom additive in a gravy form, including vegetable oil, Vitamin E, soluble fiber to help the high stool texture and discomfort, mixture of soluble and insoluble fiber and a palatant digest coating is created by mixing the ingredients for Chucky. Both the pre-manufactured kibble and the customized additive are given to the owner with feeding instructions and a copy of the above report. A copy of the individual pet profile and sample stool test is sent to Chucky's veterinarian.

EXAMPLE 2

A pet questionnaire is administered regarding a pet named "Bruno" at a remote manufacturing location, such as a retail store. The questionnaire is completed by Bruno's owner and the following information, among other information, is obtained about Bruno.

| Name of pet: | Bruno |
| Breed of Pet: | Golden Retriever |
| Weight: | 65 lbs |
| Age: | 4 Years |
| Gender: | Male |

-continued

| | |
|---|---|
| Spayed/Neutered: | Yes |
| Activity Level: | Moderate |
| Season: | Summer |
| Feeding Method: | Measured |
| Snack Schedule: | Once a day |
| Flavor Preference: | Chicken for Base and Beef Stew for Sauce |
| Body Condition: | Ideal/Fit |

Next, Bruno's owner delivers a typical stool sample of Bruno to the retail store where the feeding and care program is being administered. The following stool sample analyses of Bruno is performed.

| | |
|---|---|
| Moisture: | Normal |
| Texture: | High-Above Normal |
| Discomfort: | Yes |
| Particulates: | None |
| Color: | Normal |
| Mucin: | None to Normal |
| Parasites: | None |

Based on the above information, a pre-manufactured kibble (Base B2) is selected that is appropriate for adult, medium sized dogs with a moderate level of activity, good body condition score, the desired flavor preference and no other special health condition. Based on the kibble selected, a pre-manufactured sauce is selected (S4) which is appropriate for dogs with hard stool and/or fecal straining issues. The sauce is formulated to be distributed in a 10 oz. bottle and to complement a 5 lb. bag of dry kibble. The sauce's composition is:

| | | | |
|---|---|---|---|
| Sauce Percentage | 12.50% | | |
| Base Code | B2 (Adult) | | |
| Sauce Code | S4 Overweight W/Fiber | | |
| Formula No. | Beef Stew | | |
| Ingredient Name | Step % | Formula % | Grams |
| Animal Digest | 15.2% | 1.90% | 48.6 |
| Sodium Bisulfate | 3.8% | 0.48% | 12.2 |
| Deionized Water | 56.2% | 7.03% | 180.0 |
| Sorbic Acid | 0.2% | 0.02% | 0.6 |
| Psyllium | 0.6% | 0.07% | 1.8 |
| Corn Oil | 16.00% | 2.00% | 51.2 |
| Lactulose | 8.00% | 1.00% | 25.6 |
| Beef Stew Flavor | 0.20% | 0.03% | 0.6 |
| Total Percentage | 100.0% | 12.50% | 320.6 |

Next, an appropriate daily feeding amount is calculated based on the nutrient profile and "sauce" selected, the weight of the dog, body condition, season of the year and snacking habit. Both the pre-manufactured kibble and the pre-manufactured sauce are given to the owner with feeding instructions and a copy of the above report. A copy of the individual pet profile and sample stool test is sent to Bruno's veterinarian.

The above described methods for customizing pet foods and pet products provide a way for pet food manufacturers to address the individualized health and nutrition requirements, and preferences, of individual pets and their owners. For example, the customized pet food and pet products can be tailored to provide a desired nutritional balance for a pet of a specific age, gender and weight, at a particular time of year, and having a specific health problem, such as, for example, a food allergy. In one embodiment, application of the methods to electronic telecommunications and data processing devices enable pet food manufacturers to provide customized pet food to users located at numerous facilities or locations, including for example, homes, veterinary offices, retail grocers and retail pet stores. The customized pet food can be delivered to the user at the site of manufacture, or manufactured at a site remote from the user and shipped or mailed to the user.

While the invention has been described in terms of various specific embodiments, those skilled in the art will recognize that the invention can be practiced with modification within the spirit and scope of the claims.

What is claimed is:

1. A method for manufacturing a pet food for a pet, said method comprising:
   obtaining an individual pet profile for the pet;
   obtaining an analysis from a biological sample of the pet;
   processing the individual pet profile and the biological sample analysis to create a first pet food formula specific to the user input individual pet profile and the biological sample analysis; and
   manufacturing the pet food according to the first pet food formula.

2. A method in accordance with claim 1 wherein obtaining an individual pet profile comprises obtaining at least one of species, activity level, medical history, breed, gender, breeding status, feeding method, age, spayed/neutered status, snack schedule, flavor preference, body condition and weight of the pet.

3. A method in accordance with claim 1 wherein obtaining an individual pet profile comprises obtaining answers to a plurality of questions regarding individual attributes of the pet.

4. A method in accordance with claim 1 wherein obtaining an individual pet profile comprises obtaining answers to a plurality of questions regarding preferences of an owner of the pet.

5. A method in accordance with claim 1 wherein obtaining an analysis of a biological sample of the pet comprises obtaining an analysis of at least one of saliva, stool, hair, blood, tissue and DNA of the pet.

6. A method in accordance with claim 1 further comprising:
   processing the individual pet profile to create a second pet food formulation specific to the user input individual pet profile; and
   manufacturing the pet food according to the second pet food formula.

7. A method in accordance with claim 6 wherein obtaining a biological sample from the pet comprises obtaining at least one of saliva, stool, hair, blood, tissue and DNA of the pet.

8. A method in accordance with claim 1 wherein obtaining an analysis of a biological sample of the pet comprises obtaining a stool of the pet, the obtained analysis including information pertaining to at least one of moisture, texture, discomfort, particulates, color, mucin, and parasites.

9. A method in accordance with claim 1 wherein manufacturing the pet food comprises:
   manufacturing a basal portion; and
   manufacturing a supplemental portion.

10. A method in accordance with claim 9 wherein manufacturing a supplemental portion comprises manufacturing at least one of a gravy, a sauce, a coating, a thickener, a topping and a powder.

11. A method for manufacturing a pet food for a pet, said method comprising:
   obtaining an individual pet profile for the pet;
   processing the individual pet profile to create a first pet food formula specific to the user input individual pet profile;
   manufacturing a first pet food according to the first pet food formula;
   obtaining a biological sample from the pet after the pet has been eating the first pet food;
   analyzing the obtained biological sample to obtain information;
   processing the obtained biological sample analysis information in combination with the individual pet profile to create a second pet food formulation for the pet; and
   manufacturing a second pet food according to the second pet food formulation.

12. A method in accordance with claim 11 wherein obtaining an individual pet profile comprises obtaining information pertaining to individual attributes of the pet.

13. A method in accordance with claim 11 wherein obtaining an individual pet profile comprises obtaining information pertaining to preferences of an owner of the pet.

14. A method in accordance with claim 11 wherein obtaining a biological sample from the pet comprises obtaining at least one of saliva, stool, hair, blood, tissue and DNA of the pet.

15. A method in accordance with claim 11 wherein obtaining an analysis of a biological sample of the pet comprises obtaining a stool of the pet, the obtained analysis including information pertaining to at least one of moisture, texture, discomfort, particulates, color, mucin, and parasites.

16. A method in accordance with claim 11 wherein manufacturing the pet food comprises:
   manufacturing a basal portion; and
   manufacturing a supple mental portion.

17. A method in accordance with claim 16 wherein manufacturing a supplemental portion comprises manufacturing at least one of a sauce, a coating, a thickener, a gravy, a topping and a powder.

18. A method for customizing a pet product for a pet, said method comprising:
   receiving, through an electronic interface, a user input comprising an individual pet profile for the pet;
   receiving an analysis from a biological sample of the pet;
   electronically processing the individual pet profile and the biological sample analysis;
   creating a first pet product formula utilizing information obtained from the user input individual pet profile and the biological sample analysis; and
   manufacturing a first pet product according to the first pet product formula.

19. A method in accordance with claim 18 wherein receiving, through an electronic user interface, a user input comprises receiving, through an electronic user interface, information pertaining to individual attributes of the pet.

20. A method in accordance with claim 18 wherein receiving, through an electronic user interface, a user input comprises receiving, through an electronic user interface, at least one of species, activity level, medical history, breed, gender, breeding status, feeding method, age, spayed/neutered status, snack schedule, flavor preference, body condition and weight of the pet.

21. A method in accordance with claim 18 wherein creating a pet product formula comprises creating a formula for a pet food additive, and manufacturing a pet product according to the pet product formula comprises manufacturing a pet food additive according to he pet food additive formula.

22. A method in accordance with claim 21 wherein creating a pet food additive comprises creating at least one of a sauce, a topping, a gravy, a powder, a coating, and a thickener.

23. A method in accordance with claim 18 wherein receiving an analysis from a biological sample of the pet comprises receiving an analysis of at least one of saliva, stool, hair, blood, tissue and DNA of the pet.

24. A method in accordance with claim 18 wherein receiving an analysis from a biological sample of the pet comprises receiving an analysis of a stool of the pet, the obtained analysis including information pertaining to at least one of moisture, texture, discomfort, particulates, color, mucin, and parasites.

25. A method in accordance with claim 18 wherein manufacturing a pet product comprises:
   manufacturing a basal portion; and
   manufacturing a supplemental portion.

26. A method in accordance with claim 25 wherein manufacturing an supplemental portion comprises manufacturing at least one of a sauce, a coating, a thickener, a gravy, a topping and a powder.

27. A method in accordance with claim 18 further comprising:
   electronically processing the individual pet profile to create a second pet food formulation specific to the user input individual pet profile; and
   manufacturing a second pet product according to the second pet product formulation.

28. A method in accordance with claim 18 wherein receiving an analysis from a biological sample of the pet comprises receiving, through an electronic interface, an analysis from a biological sample of the pet.

29. A method in accordance with claim 18 wherein receiving an analysis from a biological sample of the pet comprises:
   receiving the biological sample; and
   analyzing the biological sample.

30. A method for providing a customized pet food product for a pet, said method comprising:
   receiving, through an electronic interface, a user input comprising an individual pet profile for the pet;
   electronically processing the individual pet profile to create a first pet food product formula specific to the user input individual pet profile;
   manufacturing a first pet food product according to the first pet food product formula;
   receiving an analysis from a biological sample of the pet;
   electronically processing the individual pet profile and the biological sample analysis to create a second pet food product formula utilizing information obtained from the user input individual pet profile and the biological sample analysis; and
   manufacturing a second pet food product according to the second pet food product formula.

31. A method in accordance with claim 30 wherein manufacturing a first pet food product according to the first pet food product formula comprises manufacturing a pet food additive that is to be added to a pre-manufactured kibble.

32. A method in accordance with claim 31 wherein manufacturing a pet food additive comprises manufacturing at least one of a sauce, a coating, a topping, a gravy, a powder, and a thickener.

33. A method in accordance with claim 30 wherein receiving an analysis from a biological sample of the pet comprises receiving an analysis of at least one of saliva, stool, hair, blood, tissue and DNA of the pet.

34. A method in accordance with claim 30 further comprising the step of generating electronic control signals to control operation of food manufacturing apparatus according to at least one of the pet food formulas.

35. A method in accordance with claim 30 wherein manufacturing the pet food product comprises:
    manufacturing a basal portion; and
    manufacturing a supplemental portion.

36. A method in accordance with claim 35 wherein manufacturing a supplemental portion comprises manufacturing at least one of a sauce, a coating, a thickener, a gravy, a topping and a powder.

37. A method in accordance with claim 30 wherein receiving an analysis from a biological sample of the pet comprises receiving, through an electronic interface, an analysis from a biological sample of the pet.

38. A method in accordance with claim 30 further comprising storing the user input on a computer readable medium.

39. A method in accordance with claim 30 further comprising storing the first pet food product formulation on a computer readable medium.

40. A method in accordance with claim 30 further comprising storing the biological sample analysis on a computer readable medium.

41. A method in accordance with claim 30 further comprising storing the second pet food product formulation on a computer readable medium.

42. A system for manufacturing pet food, said system comprising:
    a computer;
    a user interface including a data entry system, said user interface coupled to said computer and configured to prompt a user at said user interface to enter information regarding an individual pet profile of the pet, said computer configured to receive the individual pet profile information from the user and to receive information regarding an analysis from a biological sample of the pet, said computer also configured to process the individual pet profile and the biological sample analysis to create a first pet food product formula utilizing information obtained from the user input individual pet profile and the biological sample analysis; and
    a food product manufacturing apparatus, said computer further configured to utilize the first pet food product formula to generate at least one control signal to control the food product manufacturing process apparatus according to the first pet food product formula.

43. A system in accordance with claim 42 wherein said computer further configured to process the entered information and form an individual pet profile for the pet based on the entered information regarding an individual pet profile of the pet.

44. A system in accordance with claim 42 wherein said computer comprises a database for storing nutritional information, said computer further configured to combine the electronically communicated answers with the stored nutritional information to generate the first pet food product formula.

45. A system in accordance with claim 42 further comprising a PLC coupled to said computer and said food product manufacturing apparatus, said PLC configured to receive an input signal from said computer and generate output signals to control said food product manufacturing apparatus.

46. A system in accordance with claim 45 wherein the PLC input signal represents the customized pet food formula as determined according to the individual pet profile of the pet and nutritional data stored in the database.

47. A system in accordance with claim 42 wherein the PLC output signal represents a set of manufacturing instructions to said food product manufacturing apparatus.

48. A system in accordance with claim 42 wherein said computer configured to receive a biological sample analysis of the pet comprising at least one of saliva, stool, hair, blood, tissue and DNA of the pet.

49. A system in accordance with claim 42 wherein said computer configured to receive a stool analysis of the pet, the obtained analysis including information pertaining to at least one of moisture, texture, discomfort, particulates, color, mucin, and parasites.

50. A system in accordance with claim 42 wherein said computer configured to utilize the first pet food product formula to generate at least one control signal to control the food product manufacturing process apparatus according to the first pet food product formula and further configured to control the food product manufacturing process apparatus to manufacture a basal food portion and a food additive portion.

51. A system in accordance with claim 50 wherein controlling the food manufacturing process apparatus to manufacture a food additive portion comprises controlling the food manufacturing apparatus to manufacture at least one of a sauce, a coating, a thickener, a gravy, a topping and a powder.

52. A system in accordance with claim 42 wherein said computer is further configured to:
    process the individual pet profile to create a second pet food product formulation specific to the user input individual pet profile; and
    utilize the second pet food product formula to generate at least one control signal to control the food product manufacturing process apparatus according to the second pet food product formula.

53. A system for manufacturing pet food for a pet, said system comprising:
    a computer;
    a user interface including a data entry system, said user interface coupled to said computer and configured to prompt a user at said user interface to enter information regarding an individual pet profile of the pet, said computer configured to receive the individual pet profile information from the user and process the individual pet profile to create a first pet food formulation specific to the user input individual pet profile; and
    a food manufacturing apparatus, said computer further configured to utilize the first pet food formula to generate at least one control signal to control the food manufacturing process apparatus according to the first pet food formula;
    said computer also configured to receive information regarding an analysis from a biological sample of the pet and process the individual pet profile and the biological sample analysis to create a second pet food formula utilizing information obtained from the user input individual pet profile and the biological sample analysis; and said computer further configured to utilize the second pet food formula to generate at least one control signal to control the food manufacturing process apparatus according to the second pet food formula.

54. A system in accordance with claim 53 wherein biological sample analysis is performed on a sample taken after the pet has been eating the pet food manufactured according to the first pet food formula.

55. A method for creating a pet food formula for a pet, said method comprising:
   obtaining an individual pet profile for the pet;
   obtaining an analysis from a biological sample of the pet;
   processing the individual pet profile and the biological sample analysis to create a first pet food formula specific to the user input individual pet profile and the biological sample analysis.

56. A method for creating a pet food product formula for a pet, said method comprising:
   obtaining an individual pet profile for the pet;
   processing the individual pet profile to create a first pet food product formula specific to the user input individual pet profile;
   obtaining a biological sample from the pet after the pet has been eating a pre-manufactured basal kibble mixed with a pet food product manufactured according to the first pet food formula;
   analyzing the obtained biological sample to obtain information; and
   processing the obtained biological sample analysis information in combination with the individual pet profile to create a second pet food product formulation for the pet.

57. A method for creating a customized pet food additive formula for a pet, said method comprising:
   receiving, through an electronic interface, a user input comprising an individual pet profile for the pet;
   receiving an analysis from a biological sample of the pet after the pet has been eating a pet food manufactured according to the first pet food formula; and
   electronically processing the individual pet profile and the biological sample analysis to create a pet food additive formula utilizing information obtained from the user input individual pet profile and the biological sample analysis.

58. A method for customizing a pet food formula for a pet, said method comprising:
   receiving, through an electronic interface, a user input comprising an individual pet profile for the pet;
   electronically processing the individual pet profile to create a first pet food formula specific to the user input individual pet profile;
   receiving an analysis from a biological sample of the pet; and
   electronically processing the individual pet profile and the biological sample analysis to create a second pet food formula utilizing information obtained from the user input individual pet profile and the biological sample analysis.

59. A system for creating a pet food formula for a pet, said system comprising:
   a computer; and
   a user interface including a data entry system, said user interface coupled to said computer and configured to prompt a user at said user interface to enter information regarding an individual pet profile of the pet, said computer configured to receive the individual pet profile information from the user, said computer also configured to receive information regarding an analysis from a biological sample of the pet, said computer further configured to process the individual pet profile and the biological sample analysis to create a first pet food formula utilizing information obtained from the user input individual pet profile and the biological sample analysis.

60. A system for creating a pet food formula for a pet, said system comprising:
   a computer; and
   a user interface including a data entry system, said user interface coupled to said computer and configured to prompt a user at said user interface to enter information regarding an individual pet profile of the pet, said computer configured to receive the individual pet profile information from the user and process the individual pet profile to create a first pet food formulation specific to the user input individual pet profile;
   said computer also configured to receive information regarding an analysis from a biological sample of the pet and process the individual pet profile and the biological sample analysis to create a second pet food formula utilizing information obtained from the user input individual pet profile and the biological sample analysis.

61. A method for suggesting a pet food for a pet, said method comprising:
   obtaining an individual pet profile for the pet;
   obtaining a biological sample from the pet;
   analyzing the obtained biological sample to obtain information;
   processing the individual pet profile;
   suggesting a pre-manufactured kibble that correlates with the processed pet profile;
   suggesting a pre-manufactured additive that correlates with the processed pet profile; and
   providing a set of feeding instructions for the pet.

62. A method in accordance with claim 61 wherein processing the individual pet profile comprises processing the obtained biological sample analysis information in combination with the individual pet profile.

63. A method in accordance with claim 61 wherein providing a set of feeding instructions comprises:
   providing information regarding the proper amount of additive to feed the pet; and
   providing information regarding the proper amount of kibbles to feed the pet.

64. A method in accordance with claim 63 further comprising providing information on whether additional components should be added to the pet food.

65. A method for customizing a pet food for a pet, said method comprising:
   obtaining an individual pet profile for the pet;
   obtaining a biological sample from the pet;
   analyzing the obtained biological sample to obtain information;
   processing the individual pet profile to create a pet food additive formula;
   suggesting a pre-manufactured kibble that correlates with the processed pet profile; and
   preparing a pet food additive derived from the created pet food additive formula.

66. A method in accordance with claim 65 further comprising providing a set of feeding instructions for the pet.

67. A method, in accordance with claim 66 wherein providing a set of feeding instructions comprises:
    providing information regarding the proper amount of additive to feed the pet; and
    providing information regarding the proper amount of kibbles to feed the pet.

68. A method in accordance with claim 67 further comprising providing information on whether additional components should be added to the pet food.

69. A method in accordance with claim 65 wherein processing the individual pet profile comprises processing the obtained biological sample analysis information in combination with the individual pet profile.

70. Apparatus for customizing a pet food product for a pet, said apparatus comprising:
    means for obtaining an individual pet profile for the pet;
    means for obtaining a biological sample analysis of the pet;
    means for processing the individual pet profile and the biological sample analysis; and
    means for creating a pet food product in accordance with the processed individual pet profile and the biological sample analysis.

71. Apparatus in accordance with claim 70 wherein said means for obtaining an individual pet profile comprises receiving information from a pet profile questionnaire.

72. Apparatus in accordance with claim 70 wherein said means for obtaining a biological sample analysis comprises obtaining an analysis of at least one of saliva, stool, hair, blood, tissue, and DNA of the pet.

73. Apparatus in accordance with claim 70 wherein said means for processing the individual pet profile and the biological sample analysis comprises a computer configured to process the individual pet profile and the biological sample analysis and combine the processed information with store nutritional information to suggest a pet food product.

74. Apparatus in accordance with claim 73 wherein the pet product comprises:
    a pre-manufactured kibble that correlates with the processed pet profile;
    a pre-manufactured additive that correlates with the processed pet profile; and
    a set of feeding instructions for the pet.

75. Apparatus in accordance with claim 73 wherein the computer further configured to create a pet food additive formula utilizing the processed and stored information, the pet product comprising:
    a pre-manufactured kibble that correlates with the processed pet profile; and
    a pet food additive derived from the created pet food additive formula.

76. Apparatus in accordance with claim 73 wherein the computer further configured to:
    provide information regarding the proper amount of additive to feed the pet; and
    provide information regarding the proper amount of kibbles to feed the pet.

77. Apparatus in accordance with claim 73 wherein the computer further configured to create a pet food formula utilizing the processed and stored information.

78. A method for obtaining a customized pet food product for a pet, said method comprising:
    providing information pertaining to an individual pet profile of the pet;
    providing a biological sample of the pet; and
    obtaining a pet food product, the pet food product determined from an analysis of the provided information and the provided sample.

79. A method in accordance with claim 78 wherein obtaining a pet food product comprises:
    obtaining a pre-manufactured kibble that correlates with the provided information and the provided sample;
    obtaining a pre-manufactured additive that correlates with the provided information and the provided sample; and
    obtaining a set of feeding instructions for the pet.

80. A method in accordance with claim 78 wherein obtaining a pet food product comprises:
    obtaining a pre-manufactured kibble that correlates with the provided information and the provided sample; and
    obtaining a pet food additive derived from a pet food additive formula created utilizing the provided information and the provided sample.

81. A method in accordance with claim 78 wherein obtaining a pet food product comprises obtaining a pet food derived from a pet food formula created utilizing the provided information and the provided sample.

* * * * *